(12) United States Patent
Eckl et al.

(10) Patent No.: US 10,078,314 B2
(45) Date of Patent: Sep. 18, 2018

(54) METHOD FOR PROVIDING FUNCTIONS WITHIN AN INDUSTRIAL AUTOMATION SYSTEM, AND INDUSTRIAL AUTOMATION SYSTEM

(71) Applicant: Siemens Aktiengesellschaft, Munich (DE)

(72) Inventors: Roland Eckl, Forchheim (DE);
Andreas Henrich, Hockenheim (DE);
Harald Herberth, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 584 days.

(21) Appl. No.: 14/608,331

(22) Filed: Jan. 29, 2015

(65) Prior Publication Data
US 2015/0212504 A1    Jul. 30, 2015

(30) Foreign Application Priority Data

Jan. 29, 2014 (EP) .................................... 14153007

(51) Int. Cl.
*G06F 9/46* (2006.01)
*G05B 15/02* (2006.01)
(Continued)

(52) U.S. Cl.
CPC ......... *G05B 15/02* (2013.01); *G05B 19/0421* (2013.01); *G06F 8/60* (2013.01);
(Continued)

(58) Field of Classification Search
None
See application file for complete search history.

(56) References Cited

U.S. PATENT DOCUMENTS

| 6,335,738 B1 | 1/2002 | Englefield et al. |
| 7,389,204 B2 | 6/2008 | Eryurek et al. |
| (Continued) | | |

FOREIGN PATENT DOCUMENTS

| CN | 1310819 | 8/2001 |
| CN | 1609793 | 4/2005 |
| (Continued) | | |

OTHER PUBLICATIONS

Office Action dated Feb. 28, 2017 which issued in the corresponding Chinese Patent Application No. 201510046598.2.
(Continued)

*Primary Examiner* — Kenneth Tang
(74) *Attorney, Agent, or Firm* — Cozen O'Connor

(57) ABSTRACT

Method of providing functions within an industrial automation system and an industrial automation system thereof. Functions of the automation system are made available by web applications that are combined by the client during control program execution to form interlinked web applications. The functions are provided on a user interface of the client. The web applications are provided by a standard application programming interface that comprises a cross-component application programming interface for initializing and unloading application components and a component-specific application programming interface for event handling and providing component functions. Component instances are linked by an application programming interface for stipulating interactions between application components.

9 Claims, 2 Drawing Sheets

(51) Int. Cl.
*H04L 29/08* (2006.01)
*G05B 19/042* (2006.01)
*G06F 8/60* (2018.01)
*H04L 12/24* (2006.01)
*G06F 9/445* (2018.01)

(52) U.S. Cl.
CPC ............ *G06F 9/46* (2013.01); *H04L 41/0836* (2013.01); *H04L 67/02* (2013.01); *H04L 67/10* (2013.01); *G05B 2219/25202* (2013.01); *G05B 2219/25229* (2013.01); *G05B 2219/25232* (2013.01); *G06F 9/445* (2013.01); *H04L 67/12* (2013.01)

(56) References Cited

U.S. PATENT DOCUMENTS

| | | | |
|---|---|---|---|
| 8,190,274 | B2 | 5/2012 | Konieczny et al. |
| 8,214,068 | B2 | 7/2012 | Colombo et al. |
| 8,301,273 | B2 | 10/2012 | Dingfelder et al. |
| 8,429,251 | B2 | 4/2013 | Brunner |
| 2004/0221005 | A1 | 11/2004 | Albaugh et al. |
| 2004/0230643 | A1 | 11/2004 | Thibault et al. |
| 2005/0197805 | A1 | 9/2005 | Eryurek et al. |
| 2010/0114336 | A1 | 5/2010 | Konieczny et al. |
| 2010/0131081 | A1* | 5/2010 | Brown ............... G05B 19/0426 700/21 |
| 2010/0217423 | A1 | 8/2010 | Dingfelder et al. |
| 2010/0223493 | A1 | 9/2010 | Brunner |
| 2011/0219385 | A1* | 9/2011 | Jacobson .................. G06F 8/61 719/328 |
| 2012/0296452 | A1 | 11/2012 | Baier et al. |

FOREIGN PATENT DOCUMENTS

| | | |
|---|---|---|
| CN | 1737790 | 2/2006 |
| CN | 1937559 | 3/2007 |
| CN | 1952815 | 4/2007 |
| CN | 101149741 | 3/2008 |
| CN | 101201599 | 6/2008 |
| CN | 101730868 | 6/2010 |
| CN | 101763043 | 6/2010 |
| CN | 101971143 | 2/2011 |
| CN | 102640068 | 8/2012 |
| CN | 103019712 | 4/2013 |
| DE | 10 2008 019 040 A1 | 10/2008 |
| EP | 2 141 562 A1 | 1/2010 |
| EP | 2 221 682 A1 | 8/2010 |
| EP | 2 224 297 A1 | 9/2010 |
| EP | 2592517 | 5/2013 |
| RU | 2417393 C2 | 4/2011 |
| WO | WO 2004/109415 A1 | 12/2004 |
| WO | WO 2008/090216 A1 | 7/2008 |
| WO | WO 2008/135459 A2 | 11/2008 |
| WO | WO 2010/000646 A1 | 1/2010 |

OTHER PUBLICATIONS

Service-Oriented Paradigms in Industrial Automation; Jammes F et al: "Service-Oriented Paradigms in Industrial Automation" IEEE Transactions on Industrial Informatics, IEEE Service Center, New York, NY, US, Bd. 1, Nr. 1, Feb. 1, 2005 (Feb. 1, 2005), Seiten 62-70, XPOII128769; ISSN: 1551-3203; * Zusammenfassung; Abbildung * * Seite 63—Seite 67 * / pp. 62-70; 2005; Feb. 1, 2005.
Dynamic Web Service Composition; Mustafa F et al: "Dynamic Web Service Composition" Computer Engineering and Mustafa F et al: "Dynamic Web Service Composition" Computer Engineering and Technology, 2009. ICCET '08. International Conference on, IEEE, Piscataway, NJ, USA Jan. 22, 2009 (Jan. 22, 2009), Seiten 463-467, XP031415236; ISBN: 978-1-4244-3334-6; * Zusammenfassung; Abbildungen 1,3 * * Seite 463, rechte Spalte—Seite 466, rechte Spalte *; Jan. 22, 2009.

* cited by examiner

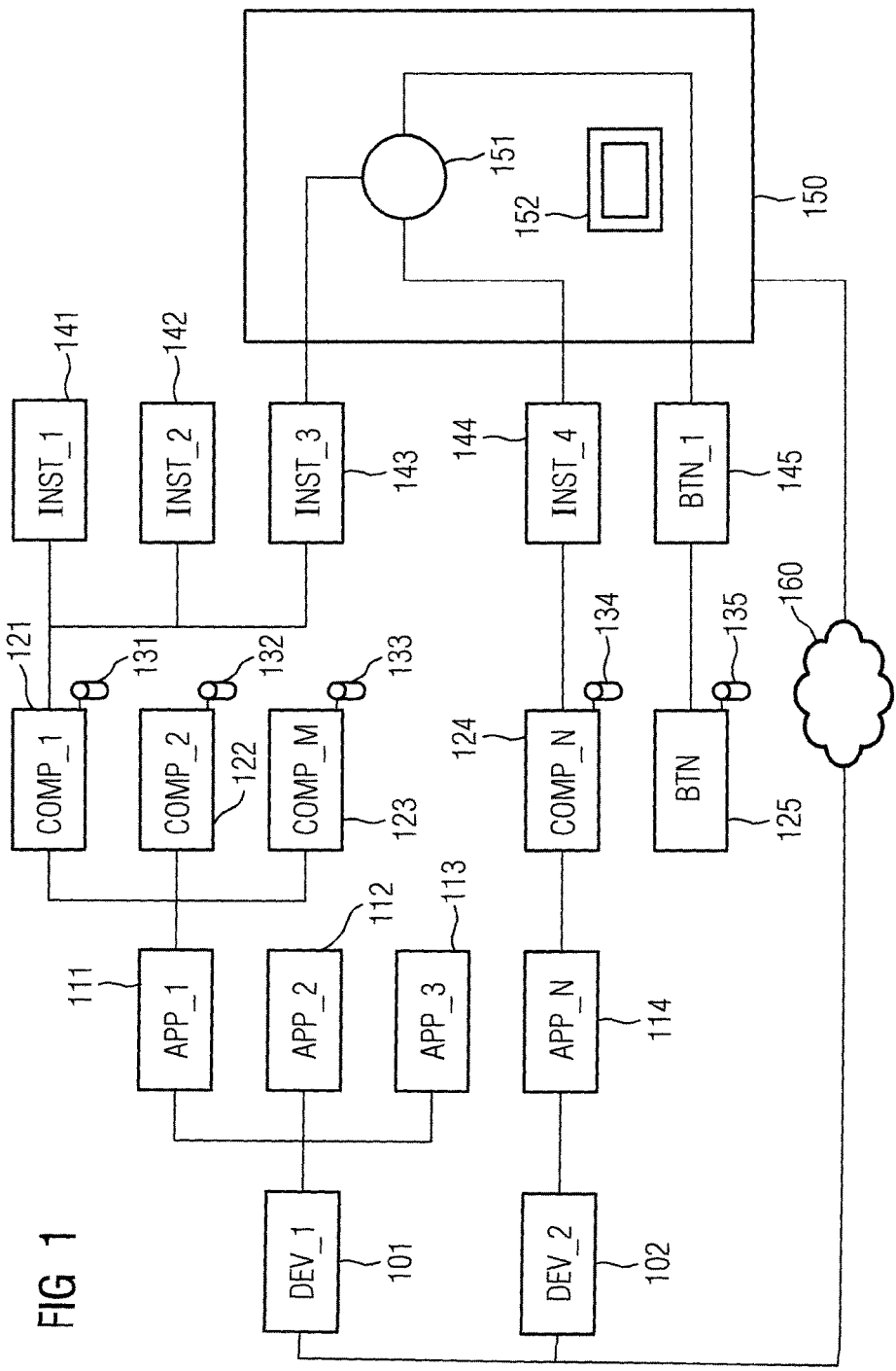

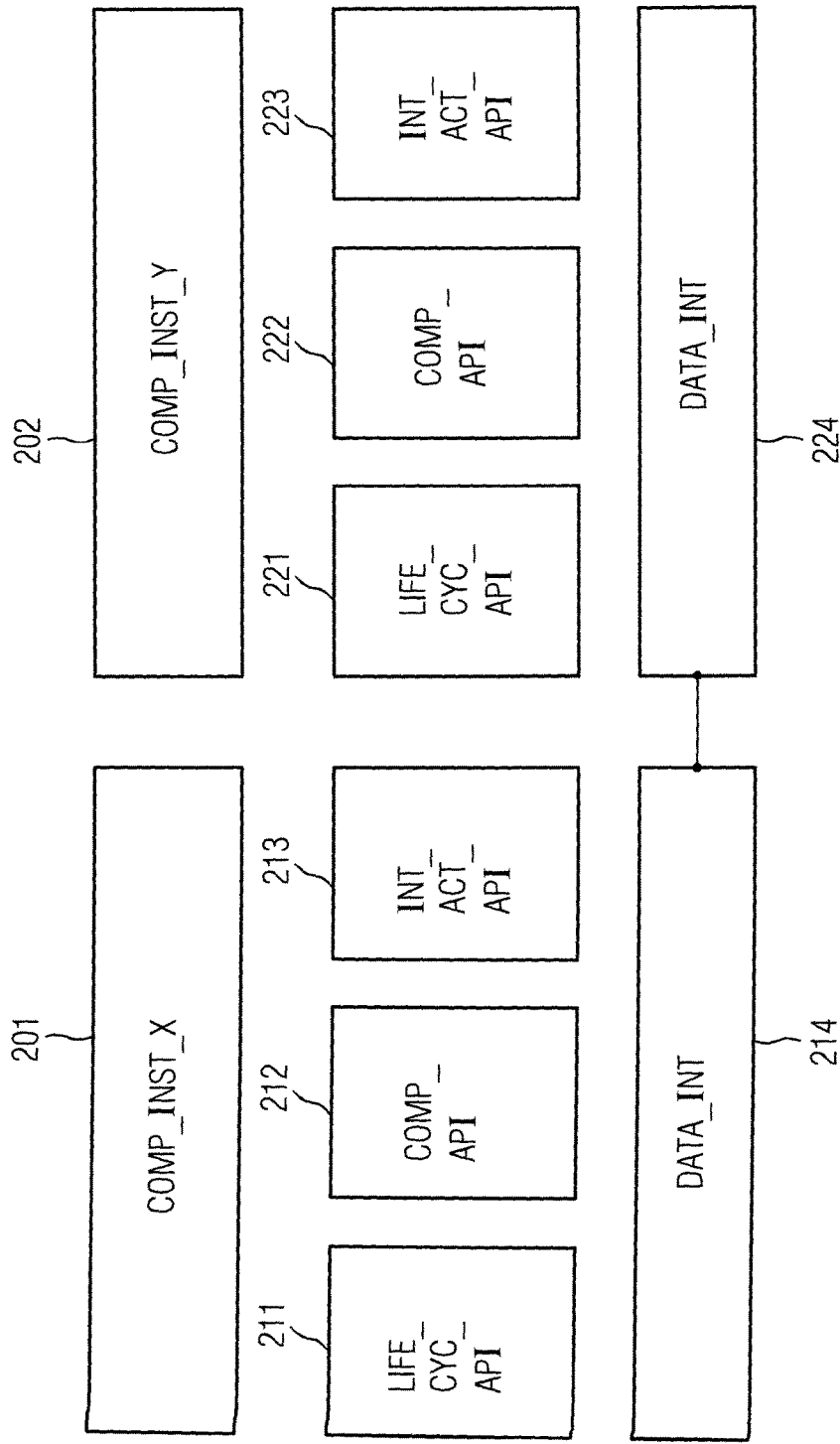

METHOD FOR PROVIDING FUNCTIONS WITHIN AN INDUSTRIAL AUTOMATION SYSTEM, AND INDUSTRIAL AUTOMATION SYSTEM

BACKGROUND OF THE INVENTION

Industrial automation systems are used for monitoring, controlling and regulating technical processes, particularly in the field of production, process, and buildings automation. Such systems allow operation of control devices, sensors, machines and industrial installations that are intended to operate as autonomously and independently of human interventions as possible. Due to the ever rising importance of information technology for automation systems (that comprise numerous networked control or computer units), methods for reliably providing functions distributed over an automation system for monitoring, control, and regulatory functions are becoming increasingly important.

For distributed services, the service components that are provided by a plurality of different control or computer units for realizing functions of an automation system, impose great demands on a communication infrastructure of the automation system. Firstly, it may be necessary to meet demands for realtime-compatible communication, having a comparatively large number of relatively short messages. Secondly, different communication protocols may be required to be used as transparently as possible for distributed services. A weak communication infrastructure can compromise error-free provision of a service and have a disadvantageous effect on system stability and availability. Regarding time-critical constraints in technical systems that are automated by industrial automation appliances, realtime communication protocols such as PROFINET, PROFIBUS or Real-Time-Ethernet are typically used for communication between automation appliances in industrial communication networks.

For access to measured values and data associated with services within an industrial automation system, there are often extremely different client demands in terms of availability or quality of service and also in terms of data filtering or information pre-compression. In addition, there are demands for extendibility of existing services by virtue of optional or additional service components without the need to substantially change a data and function model on which an implementation of an existing service is based.

WO 2004/109415 A1 discloses the practice of providing functions of an industrial automation system by means of services and of dividing function blocks into standard functions blocks and flexible function blocks. In this reference, input and output parameters of function blocks comprise a value field and a status field, which in turn has quality, substatus and limit-value attributes. To aid configuration, an interface device is provided.

US 2004/230643 A1 describes a method for providing services in a system comprising a plurality of computer units that involves services being made available by means of enterprise application integration. In this reference, services are called using a standard find-bind-execute mechanism. Furthermore, TCP/IP packets that can combine results of logically coherent operations are transmitted between a client and a server. By way of example, a result element can be combined in a TCP/IP packet in advance if, in terms of its useful data, the result is too large for a TCP/IP packet.

WO 2008/090216 A1 discloses an automation system having a service-oriented architecture and local, distributed components or appliances in a flexible and reconfigurable production environment, having at least one host computer that is connected to the service-oriented components or appliances by means of a data transmission means such as Ethernet.

General aspects of service-oriented architectures (SOA) in connection with the use of standardized communication protocols are described in F. James et al., "SERVICE-ORIENTED PARADIGMS IN INDUSTRIAL AUTOMATION", IEEE Transactions on Industrial Informatics, vol. 1, No. 1, February 2005, ISSN 1551-3203, pages 62-70. F. Mustafa et al., "DYNAMIC WEB SERVICE COMPOSITION", 2009 International Conference on Computer Engineering and Technology, ICCET 2009, 22 Jan. 2009, ISBN 978-1-4244-3334-6, pages 463-467 cite Quality of Service (QoS) as a problem area within the context of service-oriented architectures. However, this reference does not deal with division of service components into service-specific and non-service-specific components.

US 2004/221005 A1 discloses that services may comprise service-specific and non-service-specific components. However, this reference does not state that QoS measurements can be safeguarded by non-service-specific components.

EP 2 141 562 A1 discloses that distributed services in an automation system, comprising a plurality of networked computer units, are provided within a service-oriented architecture. A service-requesting computer unit divides service requests on the basis of service-providing computer units and transmits them thereto for processing. A service-providing computer unit divides the received service requests into operations that deliver logically coherent result elements. The service-providing computer unit transmits a message containing the logically coherent result elements to the service-requesting computer unit as early as when logically coherent result elements associated with an operation of a service request are available.

EP 2 221 682 A1 describes a method for providing functions in an industrial automation system that involves functions of the automation system being made available by services. Components of a service are split into service-specific components and into components that can be reused by a plurality of different services. Service-specific components and reusable components have a standard configuration interface. Service components are linked via a service configuration unit to form a service via the standard configuration interface. Functions for monitoring or controlling a defined quality of service are assigned to the reusable components.

According to EP 2 224 297 A1, components of a service are linked by a local service configuration unit to form a service via a standard configuration interface in order to consistently provide configuration data in an industrial automation system. Services are configured and activated by configuration data, the configuration data comprising information concerning the assignment of services to control units and concerning dependencies between services. The configuration data are adopted by a system configuration service from a control and monitoring unit of the automation system, checked, and transmitted to one or more destination control units. The transmitted configuration data are checked for changes in comparison with previously used configuration data by local service configuration units associated with the destination control units. The local service configuration units use changes that are established in the configuration data to ascertain lists of operations for making configuration changes, the lists being optimized to minimize service down times.

SUMMARY OF THE INVENTION

In view of the foregoing, it is an object of the present disclosure to provide a method for flexibly and efficiently provide functions distributed over a plurality of control or computer units in an industrial automation system and to provide a suitable technical implementation of the method.

On the basis of the method according to an aspect of the invention, functions of an industrial automation system are made available by way of web applications that are combined by the client during control program execution or at runtime to form interlinked web applications and are provided on a user interface on the client. The web applications respectively comprise at least one application component that respectively have at least one component instance produced for them. In one embodiment, the user interface on the client comprises a web browser. Furthermore, the web applications are provided by a standard application programming interface that comprises a cross-component application programming interface for initializing and unloading application components and also a component-specific application programming interface for event handling and providing component functions. By way of example, at least one service can be provided for cross-component functions, the service being used by a plurality of application components. The application components are respectively assigned metadata for declaring functions and dependencies.

According to one aspect of the invention, the application components respectively comprise a data interface for data access by other application components. The component instances are linked by an application programming interface for stipulating interactions between application components. In this way, it is possible to realize flexible integration of loosely coupled services or functions at runtime within an industrial automation system without such integration requiring individual programming effort. For example, the interactions between application components can be initiated by data events or by user actions.

In one embodiment, interlinked component instances are executed within a control object that is visually displayed on the user interface on the client. By way of example, the control object may be a DOM document corresponding to Document Object Model or a JavaScript Window Object. This allows either improved system performance or component isolation to be attained. Furthermore, in one embodiment, interlinked component instances can be executed in isolation within separate subordinate control objects of a control object that is visually displayed on the user interface on the client. For example, the subordinate control objects may be iFrames.

In one embodiment the industrial automation system comprises a plurality of control units that respectively comprise at least one web server for providing automation functions as web applications. In addition, at least one operator control and monitoring station is provided that has at least one web client for linking web applications on the client during control program execution on a user interface on the client. The web applications respectively comprise at least one application component that respectively have at least one component instance produced for them.

Furthermore, in one embodiment, the web applications are provided by a standard application programming interface that comprises a cross-component application programming interface for initializing and unloading application components and also a component-specific application programming interface for event handling and providing component functions. The application components respectively have associated metadata for declaring functions and dependencies.

Furthermore, in one embodiment the application components respectively comprise a data interface for data access by other application components. The component instances are linked by an application programming interface for stipulating interactions between application components.

BRIEF DESCRIPTION OF THE DRAWINGS

Further advantages, features, and possible applications are explained in more detail below using an exemplary embodiments with reference to the drawings, in which:

FIG. 1 illustrates an exemplary embodiment of an industrial automation system having functions provided in a distributed manner, FIG. 2 illustrates an exemplary embodiment of an application programming interface and a data interface operative to providing the functions of the industrial automation system as web applications.

DETAILED DESCRIPTION OF THE PRESENTLY PREFERRED EMBODIMENTS

The industrial automation system shown in FIG. 1 comprises a plurality of control units 101-102 that respectively comprise at least one web server 111-114 configured to provide automation functions as web applications. The control units 101-102 are connected by a communication network 160 to at least one operator control and monitoring station 150 that has a web client 151 for linking web applications on the client at runtime on a user interface 152 on the client. In this exemplary embodiment, the user interface 152 on the client comprises a web browser.

The web applications each comprise at least one application component 121-125 that respectively have at least one component instance 141-145 produced for them at runtime. By way of example, these application components 121-125 may also include graphical user interface objects 125, such as buttons, provided by a standard application programming interface. Component instances 145 are also produced for such user interface objects 125. Furthermore, the application components 121-125 have associated metadata 131-135 for declaring functions and dependencies. By way of example, the metadata 131-135 can be produced by the respective application component 121-125 at runtime and may comprise details relating to name, version, and restrictions of the respective application component 121-125.

According to FIG. 2, the component instances 201-202 of the web applications are provided by the standard application programming interface, which comprises a cross-component application programming interface (e.g., Life Cycle API) 221, 221 for initializing and unloading application components and also a component-specific application programming interface (e.g., Component API) 212, 222 for event handling and providing component functions. In one embodiment, at least one service is provided for cross-component functions, the service being used by a plurality of application components. For example, the component-specific application programming interface 212, 222 is used to depict or realize component-specific functions and events.

Furthermore, the application components respectively comprise a data interface 214, 224 for data access by other application components. By way of example, the data interface 214, 224 is used to stipulate whether data is made available for read access, write access or both read access and write access, and when or how notifications about data changes are sent. The standard application programming interface additionally comprises an application programming interface (Interaction API) 213, 223 for stipulating interactions between application components. This interface is used to link component instances 143-145 on the client via the web client 151, as shown by way of example in FIG. 1. The interactions between application components can be initiated by data events or by user actions, for example.

The application programming interface for stipulating interactions between application components is provided via a web portal. These interactions can take place in data-driven fashion, (for example) by virtue of data outputs of application components being connected up to data inputs of other application components. In one embodiment, data events lead to actions. In addition or as an alternative to data-driven interactions, it is also possible for user-action-driven interactions to be stipulated, for example, by dragging and dropping between application components. In the present exemplary embodiment, the web portal is further used to provide central services that are used by a multiplicity of application components. By way of example, these include services such as single sign-on or browser-local data persistence.

In one embodiment, the web portal allows two different integration options for application components. In particular, it may firstly direct integration and secondly provide isolated integration. Which integration option is particularly advantageous is dependent on the respective instance of application. For example, in the case of direct integration of application components, interlinked component instances are executed within a control object that is visually displayed on the user interface on the client. In this embodiment, the control object may be a Document Object Model (DOM) document corresponding to Document Object Model or a JavaScript Window Object. This allows very good system performance and also efficient use of shared resources. For example, such shared resources may include JS libraries.

For example, in the case of isolated integration of application components, interlinked component instances are executed in isolation within separate subordinate control objects of a control object that is visually displayed on the user interface on the client. In this embodiment, the subordinate control objects may be iFrames. This affords the advantage that application components can be loaded or unloaded as desired, and that the web portal releases resources in a simple manner by closing iFrames.

If needed, the web portal can force a directly incorporated application component into isolation. This occurs transparently for the respective application component in this embodiment by virtue of the web portal providing infrastructure within an iFrame. For the application component, this appears as though it is directly incorporated into the web portal and the only application component there. However, in this embodiment all calls on the application programming interface for stipulation of interactions are forwarded via proxies. To this end, the same infrastructure is used for communication between application components and the web portal as for the specifically isolated integration. In this embodiment, the web portal allows different views to be generated in which application components are placed and connected up to one another or the web portal.

Using a web portal engineering system, system integrators can produce and configure dedicated web portals. In one embodiment, the meta information and self-descriptions from application components are read and used for placement and connection. In this embodiment, self-descriptions can be recalled from various sources, for example from a server associated with the respective application component or from a central engineering system. This allows a web portal representation with various views and specific integration descriptions. By way of example, an engineering system can provide a graphical editor configured to arranging and connecting application components. In principle, the engineering system may be integrated in the web portal itself. This allows unrestricted adjustment of the web portal by the user thereof.

In relation to integration of automation functions on the server, the present exemplary embodiment allows flexible extendibility by new components or applications. Regarding linking of application components at runtime, less coordination effort is used.

In comparison with integration of automation functions by application servers, the present exemplary embodiment allows the use of applications that are fundamentally based on arbitrary server designs for providing application components. Furthermore, application components can be embodied independently of one another and integrated in applications or portals of other providers in the present exemplary embodiment.

Unlike the case of portals on the server, communication between application components and the backend thereof in the present exemplary embodiment takes place directly (rather than by an indirect route via a portal server). Application components are therefore not restricted to a limited selection of communication protocols that can be used; rather it is possible to use communication methods depending on individual application requirements. In relation to mash-up application integration, the present exemplary embodiment allows extended application options to be realized, for example drag and drop, navigation from application or central authentication.

In addition to providing application components by a web portal, component containers that allow application components of the web portal to be incorporated into other applications can be used. In one embodiment, the component container provides the respective application component with a portal infrastructure. In principle, the present exemplary embodiment can be implemented by alternative user interface designs. For example, instead of using a browser with HTML and JavaScript, native applications which provide a common interface with integration of application data can be provided. In various embodiments, different application components can be combined with one another at the user interface, for example by operating system assistance, such as Windows Win32 API.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. A method of providing functions within an industrial automation system, the method comprising:
providing automation functions of the automation system by a plurality of control units as web applications which are combinable by a client during control program execution to form interlinked web applications on a user interface of the client, each web application comprising at least one application component which generates at least one component instance and each control unit comprising at least one web server configured to provide the automation functions as the web applications;
providing access to the web applications via:
a standard application programming interface that comprises a cross-component application programming interface configured to initialize and unload application components, and
a component-specific application programming interface configured to handle one or more events and provide component functions; and
assigning each of the application components metadata operative for declaring functions and dependencies, wherein:
each application component comprises a data interface for data access by another application component, and
the component instances are linked by an application programming interface configured to stipulate interactions between application components.

2. The method as of claim 1, wherein the interactions are initiated by at least one of:
(i) one or more data events, and
(ii) one or more user actions.

3. The method of claim 1, wherein at least one service is provided for one or more cross-component functions, the at least one service being used by a plurality of application components.

4. The method of claim 1, wherein interlinked component instances are executed within a control object that is visually displayed on the user interface of the client.

5. The method of claim 4, wherein the control object is a document object model (DOM) document corresponding to a Document Object Model or a JavaScript Window Object.

6. The method of claim 1, wherein interlinked component instances are executed in isolation within separate subordinate control objects of a control object that is visually displayed on the user interface on the client.

7. The method of claim 6, wherein the subordinate control objects are iFrames.

8. The method of claim 1, wherein the user interface on the client comprises a web browser.

9. An industrial automation system comprising:
a plurality of control units, each control unit comprising at least one web server configured to provide automation functions as web applications;
at least one operator control and monitoring station that has at least one web client configured to link web applications on the client during control program execution on a user interface of the client,
wherein:
each web application comprises at least one application component that has at least one component instance produced for the respective web application,
each web application is provided by a standard application programming interface that comprises:
a cross-component application programming interface configured to initialize and unload the application components, and
a component-specific application programming interface configured to handle one or more events and to provide component functions, wherein:
each application component has associated metadata operative to declare functions and dependencies,
each application component comprises a data interface configured to provide data access for other application components, and
the component instances are linked by an application programming interface configured to stipulate interactions between application components.

* * * * *